(12) United States Patent
Pandit

(10) Patent No.: US 8,074,435 B1
(45) Date of Patent: Dec. 13, 2011

(54) GRASS CUTTING DEVICE

(76) Inventor: Sudhir Pandit, Hot Springs, AR (US)

( * ) Notice: Subject to any disclaimer, the term of this patent is extended or adjusted under 35 U.S.C. 154(b) by 0 days.

(21) Appl. No.: 12/778,331

(22) Filed: May 12, 2010

(51) Int. Cl.
*A01D 34/00* (2006.01)

(52) U.S. Cl. .................. 56/239; 56/194; 56/201

(58) Field of Classification Search ............ 56/400.04, 56/400.05, 400.11, 400.15, 194, 201, 202, 56/229, 233, 234, 239
See application file for complete search history.

(56) References Cited

U.S. PATENT DOCUMENTS

| | | | | |
|---|---|---|---|---|
| 606,902 | A * | 7/1898 | Tandy et al. | 56/205 |
| 747,469 | A * | 12/1903 | Nicholas | 56/205 |
| 749,572 | A * | 1/1904 | Miller | 56/205 |
| 1,010,318 | A * | 11/1911 | Regan | 56/294 |
| 1,445,952 | A * | 2/1923 | Hooper | 37/265 |
| 1,622,923 | A * | 3/1927 | Pollifrone | 56/203 |
| 1,935,013 | A * | 11/1933 | Burcke | 56/249 |
| 1,998,524 | A * | 4/1935 | Roquet | 294/55.5 |
| 2,666,662 | A * | 1/1954 | McLeod | 294/55 |
| 3,007,263 | A * | 11/1961 | Lair | 37/241 |
| 3,561,200 | A * | 2/1971 | Minunno | 56/16.6 |
| 3,680,293 | A * | 8/1972 | Klemenhagen | 56/249 |
| 6,857,255 | B1 * | 2/2005 | Wilkey et al. | 56/296 |

OTHER PUBLICATIONS

Polytetrafluoroethylene. "Applications and use". www.wikipedia.org/wiki/Teflon. pp. 4-5.*
Polytetrafluoroethylene. May 19, 2011. www.wikipedia.org/wiki/Teflon. pp. 1-12.*

* cited by examiner

*Primary Examiner* — Thomas Will
*Assistant Examiner* — Mai Nguyen
(74) *Attorney, Agent, or Firm* — Gulf Coast Intellectual Property Group,

(57) ABSTRACT

A grass cutting device operable to sever at least a portion of a blade of grass wherein the grass cutting device utilizes stationary blades and is slidably traversed across a lawn. The grass cutting device further includes a bin having a plurality of walls configured to receive and store grass clippings therein. Operably coupled to the bin proximate the front wall is a clipping guide member. The clipping guide member functions to transfer grass clippings from the blade assembly into the bin. The blade assembly is mounted to the clipping guide member distal to the bin. The blade assembly further includes a plurality of triangular shaped blades with alternately intermediate dividers. The dividers function to partition a section of grass of a lawn into a smaller portion as the section of grass enters the blade assembly in order to facilitate severing of at least a portion of the blades of grass when contacted by the plurality of blades.

4 Claims, 3 Drawing Sheets

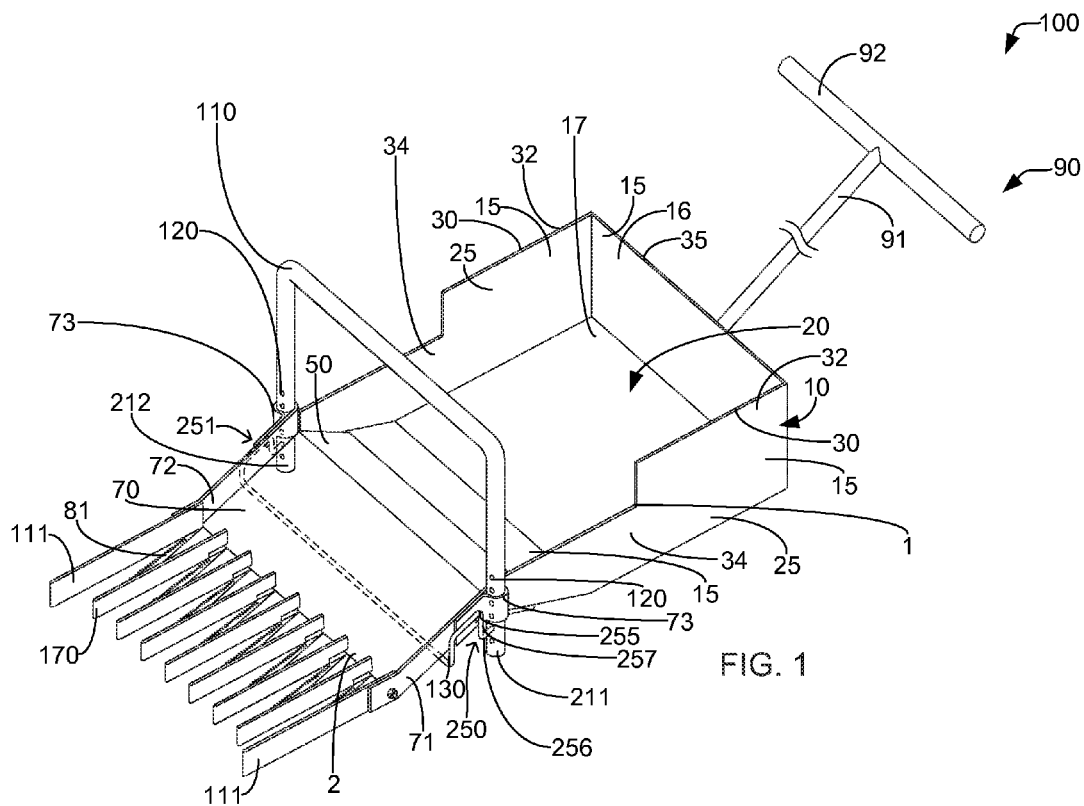
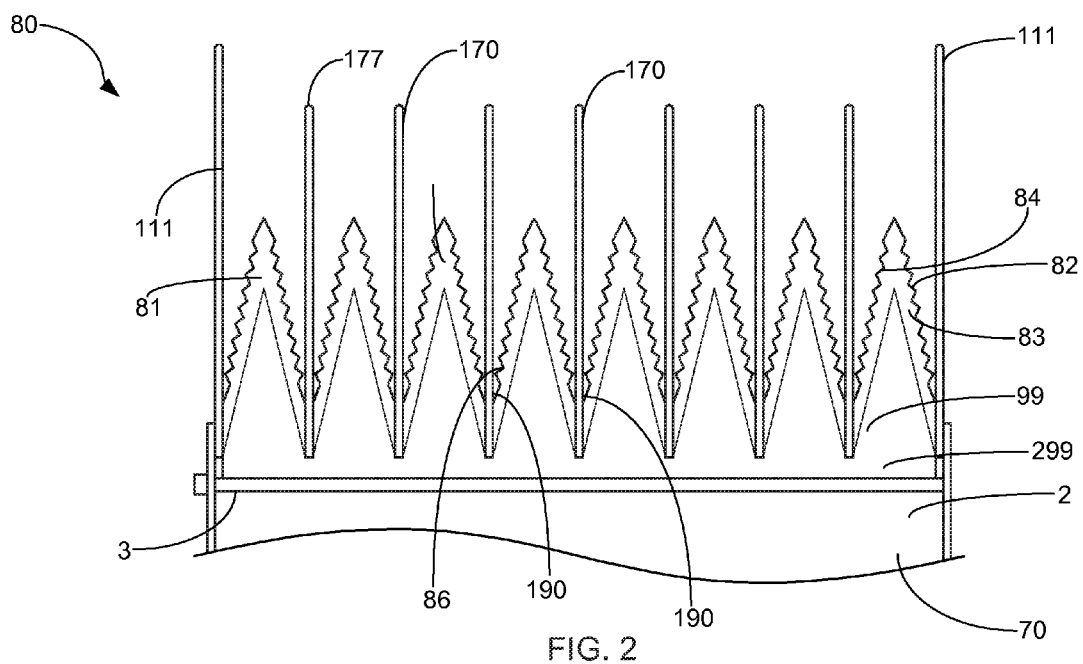

GRASS CUTTING DEVICE

FIELD OF THE INVENTION

The present invention relates to a grass cutting device, more specifically but not by way of limitation, a lawn mower that is operable to slidably traverse across a surface having grass superposed thereon wherein the lawn mower severs the blades of grass utilizing a combination of non-movable parts.

BACKGROUND

Millions of homeowners must regularly cut the grass of their lawns as part of their overall landscaping maintenance protocol. Numerous devices exists for performing the task of regularly cutting the grass. Most individuals utilize conventional lawn mowers to aid in the performance of this task. Conventional lawn mowers typically have an internal combustion engine secured to a chassis which is operable to not only propel the lawn mower but to operate rotary blade that is usually rotatably mounted underneath a cutting deck. These conventional lawn mowers have been utilized for decades to perform the task of cutting grass.

One problem with existing grass cutting devices is that they utilize traditional fuels such as gasoline to operate the internal combustion. The global consumption rate of gas and oil has dramatically increased over the last decade. The increased consumption has not only lead to record high prices it has also been hypothesized that the emissions from internal combustion engines have had a negative impact on climate change. Additionally, the current grass cutting devices that utilize internal combustion engines create a significant amount of noise during use thus contributing to an increase in noise pollution.

Another problem with current grass cutting devices that utilize internal combustion engines and rotating blades and other moving parts is the required amount of maintenance. Typically, these current grass cutting devices require engine maintenance such as but not limited to oil changes. In addition to the routine engine maintenance, the current grass cutting devices must common items such as but not limited to drive belts and/or chains replaced along with numerous other items specifically but not by way of limitation, cables, engine parts and throttle assemblies.

Another limitation of current grass cutting devices is their weight. A typical lawn mower can weigh within a range of fifty to well over a hundred pounds. Some of the models of these lawn mowers offer propulsion assistance but many do not have such assistance and require a significant amount of effort to push across a lawn.

Accordingly, there is a need for a grass cutting device that utilizes no moving parts, is extremely lightweight and maneuverable and does not utilize a internal combustion engine in order to accomplish the task of cutting grass or other similar vegetation.

SUMMARY OF THE INVENTION

It is the object of the present invention to provide a grass cutting device that utilizes no moving parts in order to sever the blades of grass that the grass cutting device contacts.

Another object of the present invention is to provide a grass cutting device that is slidably traversed across a lawn or similar surface in order to sever the blades of grass thereon.

Still another object of the present invention is to provide a grass cutting device that utilizes a plurality of triangular shaped blades having serrated edges sever the blades of grass that are engaged therewith.

An additional object of the present invention is to provide a grass cutting device that includes a plurality of dividing members intermediate each triangular shaped blade functioning to separate the grass into manageable portion for cutting.

Yet a further object of the present invention is to provide a grass cutting device that is lightweight to enable a user to slidably traverse the grass cutting device across a lawn or similar surface.

Another object of the present invention is to provide a grass cutting device that further includes a grass clipping guide that directs the severed gras blades rearward of the blade assembly.

An additional object of the present invention is to provide a grass cutting device that includes a collection area to receive and store the grass clippings.

Still a further object of the present invention is to provide a grass cutting device that has a movable blade assembly in order to adjust the height at which the user can cut the grass.

Yet a further object of the present invention is to provide a grass cutting device that is generally silent and relatively inexpensive.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a perspective view of an embodiment of the present invention; and

FIG. 2 is a detailed view of the blade assembly of the present invention.

DETAILED DESCRIPTION

Figure 4:
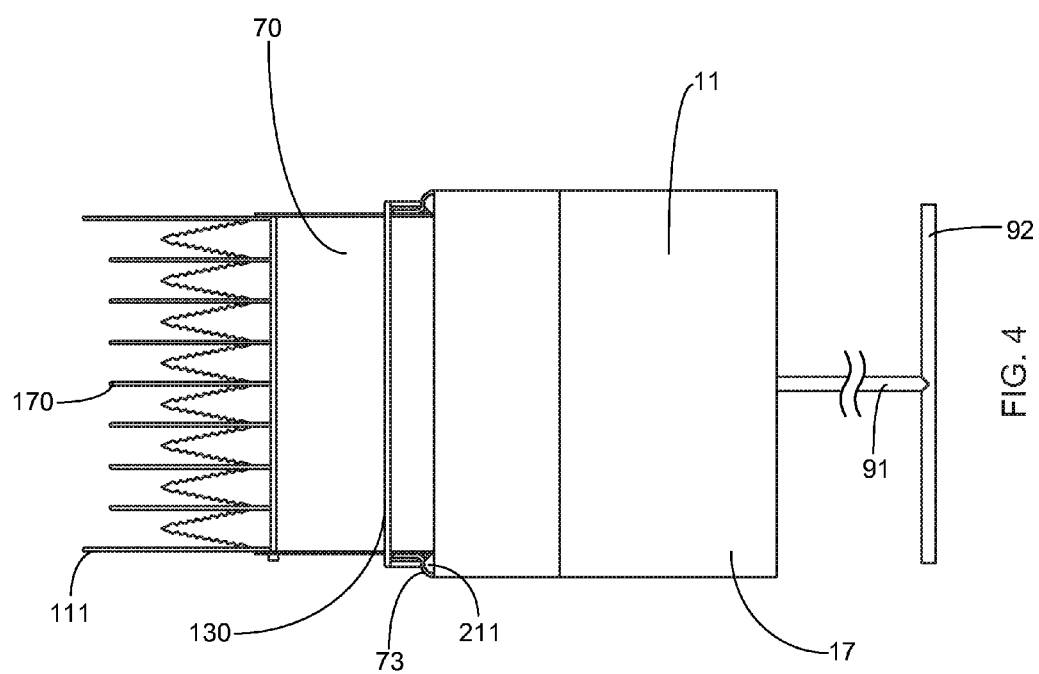
FIG. 4 is a bottom view of the embodiment of the present invention.
Figure 3:
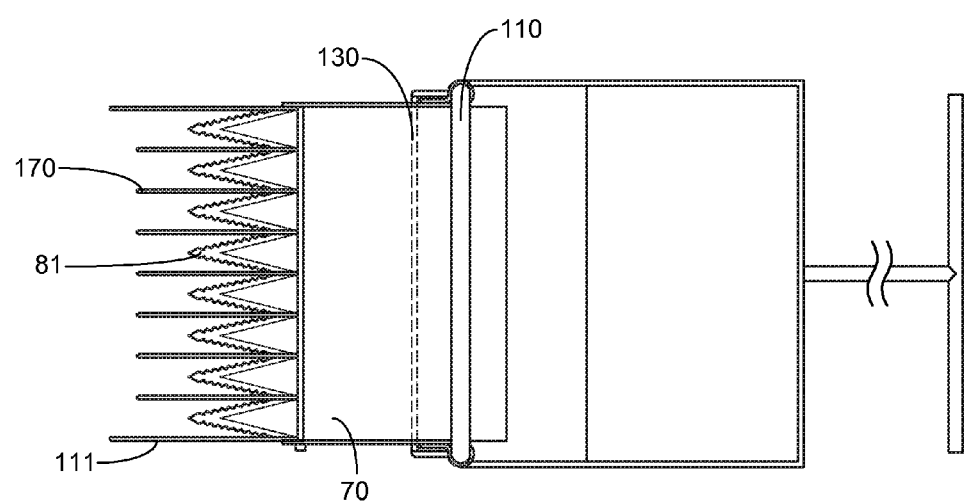
FIG. 3 is a top view of the embodiment of the present invention.

Referring now to the drawings submitted herewith, wherein various elements depicted therein are not necessarily drawn to scale and wherein throughout the views and figures like elements are referenced with identical reference numerals, there is illustrated an grass cutting device 100 constructed according to the principles of the present invention.

Referring in particular to FIG. 1, there is a perspective view of the grass cutting device 100 illustrated therein. The grass cutting device 100 further includes a bin 10 configured with four walls 15 and a bottom 17 defining an interior volume 20 functioning to receive and store grass clippings therein. The bin 10 is generally square in shape and manufactured from a suitable durable material such as but not limited to metal. The four walls 15 and bottom 17 are integrally formed with each other utilizing suitable durable connections methods such as but not limited to welding. While the bin 10 is illustrated herein as being generally square in shape, it is contemplated within the scope of the present invention that the bin 10 could be formed in numerous different shapes. Furthermore, while good results have been achieved utilizing a bin 10 that has four walls 15, it should be recognized by those skilled in the art that the bin 10 could be formed with numerous different quantities of walls 15 and bottom 17 defining an interior volume 20 sufficient in size to accommodate grass clippings therein. The side walls 25 have an upper longitudinal edge 30 that defines an upper portion 32 and a lower portion 34 with the upper longitudinal edge 30 having an angle 1 of approximately ninety degrees therebetween. The upper longitudinal edge 30 defines the top of the bin 10 along with the upper edge 35 of the rear wall 16. The shape of the upper edge 35 and the upper longitudinal edge 30 function to define the quantity of grass clippings that can be retained in the bin 10. It is contemplated within the scope of the present invention that the upper longitudinal edge 30 and the upper edge 35 could be configured in numerous different shapes so as to define the top of the bin 10.

The bin 10 includes a front wall 40 that is configured in an angular and is integrally formed with the side walls 25 and the bottom 17. The angular manner of the front wall 40 mates with the coupling member 50 so as to prevent any gap between the clipping guide member 70 and the bin 10 ensuring that all grass clippings are transferred from the clipping guide member 70 to the bin 10 subsequent being severed by the blade assembly 80. The angular manner of the front wall 40 further assists in the movement of the grass cutting device 100 across a lawn or other desired surface. The angle of the front wall 40 is generally upwards from the bottom 17 so as to substantially inhibit any direct contact with objects on the surface on which the grass cutting device 100 is being traversed. More specifically but not by way of limitation, the upwards angle of the front wall 40 facilitates an angle of contact with an object on the surface of which the grass cutting device 100 is being traversed wherein the angle of contact between the front wall 40 and the object is acute which reduces the force and potential friction between the front wall 40 and the object thereby allowing the bin 10 to slide easier across a desired surface.

A handle 90 is attached to the rear wall 16. The handle functions as the interface to allow a user to move the grass cutting device 100. The handle 90 includes a lower member 91 and an upper member 92 that are manufactured from tubular pipe or steel and are integrally mounted to each other at an angle of approximately ninety degrees. The lower member 91 of the handle 90 is pivotally mounted to the bin 10 utilizing suitable methods proximate the rear wall 16 to allow the user to position the handle 90 at a desired angle during use of the grass cutting device 100. As shown in particular in FIG. 4 the bottom 17 of the bin 10 has an exterior surface 11 that is generally smooth so as to facilitate the slidable traversing of the bin 10 across a desired surface such as but not limited to a lawn. It is further contemplated within the scope of the invention that the exterior surface 11 have disposed substantially thereon a friction reducing material such as bit not limited to Teflon. Additionally, while not illustrated in the drawings submitted herewith, it is contemplated within the scope of the present invention that the exterior surface 11 of the bottom 17 could further include rollers or wheels so as to facilitate the movement of the grass cutting device 100 across a desired surface.

A support member 110 is integrally formed with the front wall 40. The support member 110 is generally cylindrical in form and substantially u-shaped having a first end 111 and a second end 112 that are fastened to the bin 10 proximate the front wall 40 utilizing suitable durable methods such as but not limited to welding. The support member 110 functions to provide an area for which the user can use to grasp and lift the grass cutting device 100. Those skilled in the art will recognize that the support member 110 could be formed in numerous different shapes and constructed from material other than cylindrical in shape. A plurality of apertures 120 are journaled through the first end 111 and second end 112. The apertures 120 function to receive the locking rod 130, which supports the clipping guide member 70 at a desired height. The clipping guide member 70 further includes a first side wall 71 and second side wall 72. Integrally formed with the first side wall 71 and second side wall 72 distal from the blade assembly 80 are mounting rings 73. The mounting rings 73 circumferentially encircle the first end 211 and second end 212 of the support member 110 and are slidably mounted thereto. The mounting rings 73 allow the user to adjust the height of the blade assembly 80 to control the level at which the grass will be cut while the grass cutting device 100 is propelled across a lawn.

The locking rod 130 functions to allow the user to adjust the height of the clipping guide member 70. The locking rod 130 has a first end 250 and a second end 251 (shown in dotted lines in FIG. 1) that are formed in a modified z shape having an upper angle 255 and a lower angle 256 with an intermediate portion 257 therebetween. The upper angle 255 has conventional hinge that functions to allow the intermediate portion 257 and the lower angle 256 to move forward towards the blade assembly 80 when the locking rod 130 is biased in an upwards direction proximate its midpoint 131. This releases the first end 250 and second end 251 from the apertures 120 facilitating the vertical positioning of the clipping guide member 70. When no biased upward force exists proximate the midpoint 131 of the locking rod 130 the first end 250 and second end 251 engage their respective adjacent apertures 120 and gravitational force on the locking rod 130 maintains this position. Those skilled in the art will recognize that the locking rod 130 could have numerous alternate configurations in addition to and/or in conjunction with the embodiment of the locking rod 130 as described herein and still achieve the desired function.

The clipping guide member 70 is manufactured from suitable durable material such as but not limited to metal. The clipping guide member 70 as previously mentioned herein is movably mounted to the bin 10 utilizing the mounting rings 73. The clipping guide member 70 consists of a ramp 77 that is generally planar in manner having integrally formed therewith the first side wall 71 and second side wall 72. The clipping guide member 70 when coupled to the bin 10 is generally positioned in an angular manner. The clipping guide member 70 functions to direct the grass clippings from the blade assembly 80 into the bin 10 for storage and subsequent removal. The clipping guide member 70 has hingedly attached along the edge 79 the coupling member 50. The coupling member 50 is hingedly attached by suitable methods to the clipping guide member 70 so as to ensure that the angle of the coupling member 50 is approximately equivalent to the angle of the front wall 40 facilitating the even flow of grass clippings into the bin 10 from the clipping guide member 70.

Figure 5:
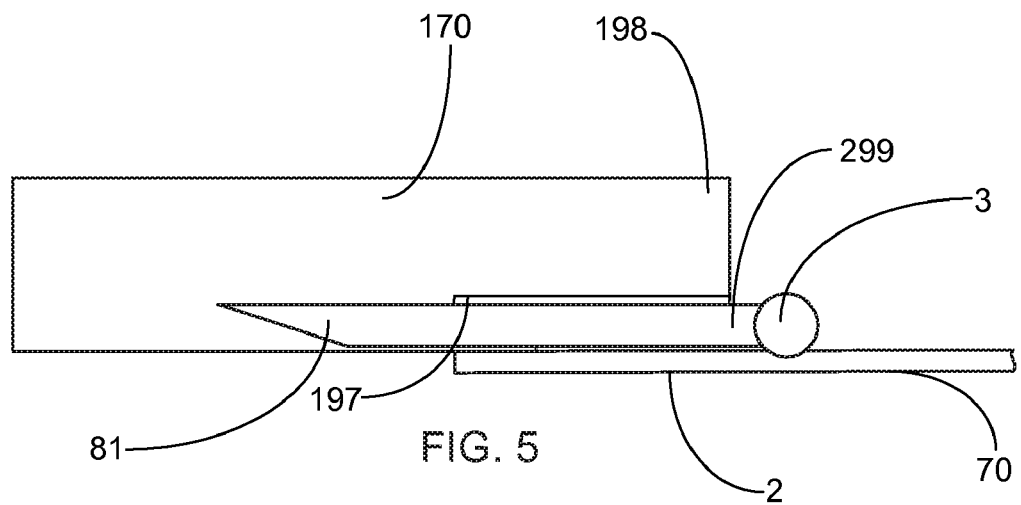
FIG. 5 is a side view of the blade assembly integrally attached to the dividers illustrated in a horizontal manner for illustrative purposes only.

Referring in particular to FIG. 2 and FIG. 5, a detailed view of the blade assembly 80 is illustrated therein. The blade assembly 80 is manufactured as a single assembly that includes a plurality of blades 81 integrally formed with and extending from a base member 299. The blade assembly 80 is mounted proximate the front edge 2 of the clipping guide member 70 utilizing the rod 3. The blade assembly 80 slidably and mateably mounts in a notch 197 proximate the rear portion 198 of the dividers 170. Subsequent being moved to as forward a position as permitted by the notch 197, the rod 3 is positioned immediately behind the base member 299 of the blade assembly 80 to maintain the position of the blade assembly 80 during use of the grass cutting device 100. The rod 3 is journaled through the opposing pair of outer dividers 111 so as to maintain a biased position against the base member 299 of the blade assembly 80. The blades 81 are generally horizontal in configuration and triangular in shape having a serrated edge 82 along each cutting surface 83 that facilitate the severing of the blades of grass as the blades of grass travel along either the first cutting surface 83 or the second cutting surface 84. The blade assembly 80 is configured to be stationary during the use of the grass cutting device 100. The blade assembly 80 are manufactured from a suitable durable material such as but not limited to titanium. The serrated edge 82 assists in substantially severing the portion of the blade of grass that is generally above the blade 81. As the blade of grass reaches the rear portion 86 of the blade 81, the blade of grass is biased intermediate the dividers 170 and blade 81 wherein the force of the forward movement of the grass cutting device 100 is sufficient in combination with the sharpness of the serrated edge 82 of the blades 81 and the position of the blade of grass at intersection 190 to sever the portion of the blade of grass that is generally above the blades 81. The intersection point 190 is the area of union between the blades 81 and the dividers 170. The intersection point 190 is the location where the final separation of the upper portion of the blade of grass is conducted for those blades of grass that have not previously had their upper portion severed during their movement along the either the first cutting surface 83 or second cutting surface 84. It is contemplated within the scope of the present invention that the first cutting surface 83 and second cutting surface 84 could be manufactured utilizing a non-serrated edge. Additionally it is contemplated within the scope of the present invention that the blades 81 could be formed in generally triangular shapes wherein the triangles consist of numerous types of triangles to form at least one cutting surface. While no particular length of the blade 81 is required, good results have been achieved utilizing a blade 81 that is approximately two and a half inches in length.

Intermediate each blade 81 is a divider 170. The dividers 170 are integrally formed with the clipping guide member 70 and positioned so as to be alternately intermediate with the blades 81. The dividers 170 have a notch 197 so as to slidably and mateably receive the blade assembly 80. As shown in the Figures submitted herewith the blade assembly 80 is configured to have alternating blades 81 that are intermediate the dividers 170 when the blade assembly 80 is engaged with the grass cutting device 100. A pair of outer dividers 111 are proximate each side 79 of the blade assembly 80. The dividers 170 are generally planar in manner and vertical in configuration. The dividers 170 are manufactured from a suitable durable material such as but not limited to metal. The dividers 170 extend outward from the clipping guide member 70 and function to separate the grass into manageable size portions to be received and cut by the blades 81. The dividers 170 and blades 81 join proximate the base 99 of the blades 81 at the aforementioned intersection point 190 where prior to reaching the intersection point 190, the blades of grass have traveled across either the first cutting surface 83 or second cutting surface 84 and the portion of the blade of grass generally above the blade 81 that has not been severed will be biased into the intersection point 190 and severed. The angle of the intersection point 190 is small so as to facilitate the biasing of the blade of grass therein. While no angle of the intersection point 190 is required, it is contemplated within the scope of the present invention that the intersection point has an acute angle of approximately ten degrees. It is contemplated within the scope of the present invention that the grass cutting device 100 could be manufactured having a blade assembly 80 having numerous different quantities of blades 81. Additionally it is contemplated within the scope of the present invention that the grass cutting device 100 could be manufactured with numerous quantities of dividers 170 and still achieve the desired function as described herein. Furthermore, as shown in the drawings submitted herewith the tips 177 of the dividers 170 are generally arcuate in shape so as to facilitate traversing through a patch of grass with less resistance.

Referring in particular to FIGS. 1 and 4, a description of the operation is as follows. In use, the user will superpose the grass cutting device 100 on a desired surface such as a lawn. The blade assembly 80 is adjusted to the desired height by utilizing the locking rod 130 wherein the locking rod 130 is inserted into the apertures 120 that positions the clipping guide member 70 and the blade assembly 80 at the desired height. The user grasps the handle 90 and pivots the handle to the desired height. Ensuing positioning the handle 90 to the desired height the user begins to propel the grass cutting device 100 across the lawn by manually pushing the grass cutting device 100. The exterior surface 11 of the bottom 17 slides across the surface and the angular front wall 40 further facilitates the slidable movement of the grass cutting device 100. As the grass cutting device 100 is propelled across the lawn, the dividers 170 separate incoming section of grass into bundles that are approximately the width of the area intermediate the dividers 170. Subsequent the grass being separated into bundles, the blades of grass within the bundle contact the blades 81. As the grass cutting device 100 is continually propelled in a generally forward direction, the blades of grass begin to contact the serrated edge 82 of either the first cutting surface 83 or the second cutting surface 84. As the blades of grass travel across the serrated edge 82, the serrated edge severs the portion of the blade of grass that is generally above the blade 81. If a blade of grass is not severed as it travels across the serrated edge 82 it will engage the intersection point 190 wherein the blade of grass is biased therein with sufficient force to sever the portion generally above the blade 81.

As the blades of grass are severed, the clipping guide member 70 captures the blades of grass and directs the blades of grass into the bin 10. The user propels the grass cutting device 100 across the lawn until the bin 10 is substantially filled with grass clippings. Subsequent the bin 10 being substantially full of grass clippings the user will utilize the support member 110 to grasp the grass cutting device 100 and invert to remove the grass clippings to a desired trash receptacle or mulch pile.

Although no particular weight of the grass cutting device 100 is required, it is contemplated within the scope of the present invention that the grass cutting device 100 weighs no more than three pounds. Additionally, while the blades 81 in their preferred embodiment have a first cutting surface 83 and a second cutting surface 84, it is contemplated that the blades 81 could have only one cutting surface and still achieve the desired function as described herein. It should also be recognized by those skilled in the art that the grass cutting device 100 could be used to cut numerous different types of vegetation in addition to grass.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A manually powered lawn mower having stationary blades configured to be slidably traversed across a lawn utilizing human power comprising:

a bin, said bin having a bottom, two side walls, a rear wall and a front wall defining an interior cavity, said interior cavity being of sufficient volume to receive and store a plurality of grass clippings therein, said front wall being mounted in an angular manner to said bottom, said front wall being generally angled in an upwards manner with respect to said bottom, said front wall operable to assist in the slidable traversing of the lawn mower across a lawn;

a clipping guide, said clipping guide operably connected to said bin, said clipping guide further including a clipping surface, said clipping surface being generally planar in manner, said clipping surface having integrally formed therewith a first side wall and a second side wall, said first side wall having a first end and a second end, said secnd side wall having a first end and a second end, said clipping guide further including a first mounting ring and a second mounting ring proximate said second end of said first side wall and said second side wall, said clipping guide configured to direct grass clippings into said interior cavity of said bin;

a blade assembly, said blade assembly further including a plurality of blades, said plurality of blades operably connected to said clipping guide distal to said bin, said plurality of blades oriented in a generally horizontal manner, said plurality of blades being generally stationary during use of the lawn mower, said blade assembly further including a plurality of dividers, said plurality of dividers alternately intermediate said plurality of blades, said plurality of dividers configured in a substantially vertical manner, said plurality of dividers operable to divide a section of blades of grass of a lawn into smaller portions prior to the section of blades of grass of the lawn contacting said plurality of blades; and a support member, said support member being generally u-shaped, said support member having a first end and a second end, said first end of said support member mateably connected to said first mounting ring, said second end of said support member mateably connected to said second mounting ring, said first end of said support member and said second end of said support member having a plurality of apertures journaled therein, said support member operable to moveably couple said clipping guide to said bin.

2. The lawn mower as recited in claim 1, wherein said plurality of blades are generally triangular in shape having a first cutting surface and a second cutting surface.

3. The lawn mower as recited in claim 2, wherein said plurality of blades and said plurality of dividers further include a plurality of intersection points, said plurality of intersection points being formed by said plurality of blades and said plurality of dividers, said intersection points formed in an acute angle, said intersection points functioning to sever the portion of the blade of grass that is above said plurality of blades.

4. The lawn mower as recited in claim 3, wherein said plurality of blades are manufactured from titanium.

* * * * *